United States Patent [19]

Gollub et al.

[11] Patent Number: 4,716,189

[45] Date of Patent: Dec. 29, 1987

[54] COMPOSITION

[75] Inventors: Hans J. Gollub, Bühl; Dieter A. Hechenberger, Sinsheim; Renate Moermann, Bühl, all of Fed. Rep. of Germany

[73] Assignee: Lingner & Fischer GmbH, Fed. Rep. of Germany

[21] Appl. No.: 1,378

[22] Filed: Jan. 8, 1987

[30] Foreign Application Priority Data

Jan. 10, 1986 [GB] United Kingdom ............... 8600599

[51] Int. Cl.$^4$ .......................................... C08F 110/02
[52] U.S. Cl. .................................... 524/284; 524/314; 524/315
[58] Field of Search ................... 524/533, 594, 284

[56] References Cited

U.S. PATENT DOCUMENTS 3,576,776  4/1971  Muszik et al. ..................... 260/29.6
3,787,345  1/1974  Dickman et al. ............... 260/28.5 R
3,787,346  1/1974  Dickman et al. ............... 260/28.5 R

*Primary Examiner*—Joseph L. Schofer
*Assistant Examiner*—Angela L. Fugo
*Attorney, Agent, or Firm*—Jacobs & Jacobs

[57] ABSTRACT

A stick for the application of adhesive material to a substrate, comprising an adhesive dissolved or dispersed in a liquid medium containing an alkali metal or ammonium salt of an aliphatic carboxylic acid having from 8 to 36 carbon atoms, characterized in that the adhesive comprises a mixture of (i) an aqueous dispersion of an optionally carboxylated ($C_4$ to $C_{10}$)-alkyl ester of acrylic acid and (ii) an aqueous dispersion of polyethylene.

The stick enables articles to be removably bonded to substrates without leaving a film of adhesive on the substrate after removal.

9 Claims, No Drawings

COMPOSITION

This invention relates to a stick for the application of adhesive to substrates.

U.K. Patent No. 1365147 (Uhu-Werke H.u.M. Fischer, GmbH) discloses self-supporting adhesive sticks which utilise long chain aliphatic carboxylic acids or esters of such acids as a 'structuring' substance. Such sticks are useful in conventional adhesive work where paper or cardboard sheets are intended to be bonded together permanently. When the layer of adhesive from the stick dries out, the bonded materials generally cannot be separated without tearing or otherwise damaging them. It would be useful to have an adhesive stick for temporary bonding purposes, such as attaching pieces of paper bearing messages to a notice board, desk, window or other substrate, the paper being removable without difficulty and without leaving a film of adhesive on the substrate.

It has now been found that by using, as the adhesive, an aqueous dispersion of a particular acrylic ester and an aqueous polyethylene dispersion, an adhesive stick having the desired temporary bonding properties can be formulated and can be used in the same convenient manner as conventional sticks.

According to the present invention there is provided a stick for the application of adhesive material to a substrate, comprising an adhesive dissolved or dispersed in a liquid medium containing an alkali metal or ammonium salt of an aliphatic carboxylic acid having from 8 to 36 carbon atoms, characterised in that the adhesive comprises a mixture of (i) an aqueous dispersion of an optionally carboxylated ($C_4$ to $C_{10}$)-alkyl ester of acrylic acid and (ii) an aqueous dispersion of polyethylene.

Preferably, the adhesive stick according to the invention comprises from 10 to 60% by weight of the above defined ($C_4$ to $C_{10}$)-alkyl ester of acrylic acid, based on the dry weight of the ester relative to the total weight of the stick composition.

Preferred ($C_4$ to $C_{10}$)-alkyl esters of acrylic acid suitable for use in the adhesive stick according to the invention are (i) a carboxylated octyl ester of acrylic acid, and a suitable material is sold as a 70% by weight aqueous dispersion under the trade name 'Acronal V205' ('Acronal' is a trade mark of BASF), and (ii) a carboxylated ethyl hexyl ester of acrylic acid and a suitable material is sold as a 45% by weight aqueous dispersion under the trade name 'Vinacryl 4512' ('Vinacryl' is a trade mark of Vinamul GmbH).

Suitably, a combination of two different ($C_4$ to $C_{10}$)alkyl esters is used in the adhesive stick of the invention, preferably a combination of the esters (i) and (ii) defined above. The dry weight ratio of the two different esters in the combination may be from 9:1 to 1:9, preferably from about 1:2 to 2:1. A dry weight ratio of about 1:1 is particularly preferred.

The aqueous dispersion of polyethylene is included in the adhesive stick to help balance the 'tackiness' of the acrylic materials, in order to give the final product the desired adhesive characteristics.

Preferably, the adhesive stick comprises from about 0.5 to 10%, more preferably from 2 to 10%, especially from 4 to 7%, of polyethylene, based on the dry weight of the polyethylene relative to the total weight of the stick composition. The polyethylene is preferably used in the form of a 40% by weight dispersion in aqueous medium and a suitable material is sold under the trade name 'Epotal 181D' ('Epotal' is a trade mark of BASF).

Additional adhesive materials may also be incorporated in the adhesive stick of the invention. Examples include polyacrylamides, cellulose derivatives, alkyd resins, acrylated alkyd resins, polyvinyl acetates, and polyvinyl-pyrrolidone. Preferably, polyvinylpyrrolidone is used, suitably in a dry weight amount of from about 0.1 to 5% by weight, based on the total weight of the stick composition. A suitable material is sold under the trade name 'Luviskol' ('Luviskol' is a trade mark).

The carboxylic acid moieties in the alkali metal or ammonium carboxylate salts present in the adhesive stick of the invention may have branched or straight chains, may be saturated or contain double bonds, and may be unsubstituted or contain simple substituents, for example chlorine or bromine atoms. Aliphatic monocarboxylic acids are preferred, especially fatty acids having from 12 to 22 carbon atoms. These may be obtained from natural fats or oils.

The alkali metal or ammonium carboxylate salt is preferably soluble in water. In general, a sodium salt is preferred, but lithium salts, potassium salts or, in some cases, ammonium salts may also be used. Especially preferred are sodium salts of fatty acids having from 12 to 22 carbon atoms.

Particularly favourable results may be obtained using a mixture of sodium stearate or sodium palmitate, or a mixture thereof, preferably in an amount of from 4 to 10% by weight, based on the total weight of the stick composition.

The alkali metal or ammonium carboxylate salt may be dissolved in water or in a water-miscible organic solvent or a mixture of water and a water-miscible organic solvent. Preferably at least some water is used, and particularly preferably water is used alone.

Examples of suitable water-miscible organic solvents include methanol, ethanol, isopropanol, propylene glycol, ethylene glycol, glycerine, amyl alcohols, benzyl alcohol, tetrahydrofuran, dimethyl formamide, dimethyl sulphoxide, and ketones (for example acetone and methyl ethyl ketone).

The total amount of water and/or other solvent present in the stick of the invention is preferably from about 5 to 60%, more preferably from about 40 to 50%, by weight based on the total weight of the stick composition.

In addition to the above-mentioned ingredients, the adhesive stick of the invention may contain further substances conventionally used in adhesive materials, for example plasticisers or moisture retainers, emulsifiers, waxes, pigments, dyes, fillers, and perfumes.

Examples of suitable plasticisers or moisture retainers include tri- and tetra-ethylene glycol, sorbitol, mannitol, glucose, and low molecular weight polyethylene glycol (molecular weight up to about 4000).

Such plasticisers or moisture retainers, which are preferably used in an amount of from 2 to 10% by weight, based on the total weight of the stick composition, help to confer a light, soft 'rub-off' characteristic to the composition. It is also advantageous to include a small amount of alkaline material, preferably an alkali metal hydroxide, to neutralise free carboxyl groups in the acrylic acid esters. Such alkaline material may be present in an amount of from 1 to 5%, preferably from 1 to 3%, by weight, based on the total weight of the stick composition.

Emulsifying agents may also be present, suitably in an amount of up to 5% by weight, based on the total weight of the stick composition. A particularly suitable material is a non-ionic emulsifier sold under the trade name 'Pluronic F87', or 'Pluronic F108' ('Pluronic' is a trade mark), or an anionic emulsifier sold under the trade name 'Lutensit' ('Lutensit' is a trade mark of BASF).

The adhesive stick of the invention may suitably be prepared by stirring the ingredients together at a temperature of from about 60° to 90° C., until homogeneous, and then allowing the mixture to cool either in a mould or after being extruded in the desired stick shape.

The adhesive stick according to the invention may be conveniently mounted in an applicator of the lipstick-holder type. In such a holder, it may be readily carried among personal possessions or kept in an office desk for use in light glueing applications, such as sticking sheets of paper bearing messages to a notice board, desk-top or other surface. Provided the water and/or other solvent in the composition has had time to evaporate more or less completely (which will usually take about 30 seconds to 1 minute at room temperature) the paper may be peeled away from the supporting surface without leaving adhesive on the surface or tearing the paper.

The types and quantities of ingredients in the adhesive stick of the invention may be varied within the specified limits in order to obtain the required properties for a particular technical application.

The following examples illustrate the invention. In each example, the specified ingredients were stirred together, until homogeneous, at a temperature of 60° to 90° C., and the mixture was then poured into a stick-shaped mould, where it was allowed to cool.

The following trade names are used in the examples:

'Acronal V 205'—a 70% aqueous dispersion of a carboxylated octyl ester of acrylic acid, obtainable from BASF.

'Vinacryl 4512'—a 45% aqueous dispersion of carboxylated ethyl hexyl ester of acrylic acid, obtainable from Vinamul GmbH 'Epotal 181D'—a 40% aqueous dispersion of polyethylene, obtainable from BASF.

'Pluronic F87' and 'Pluronic F108'—non-ionic emulsifiers.

'Acronal', 'Vinacryl', 'Epotal', and 'Pluronic' are trade marks.

| Example 1 | % by weight |
|---|---|
| Acronal V 205 | 24.0 |
| Vinacryl 4512 | 36.0 |
| Epotal 181 D | 9.0 |
| Polyvinylpyrrolidone | 4.0 |
| Myristic acid | 9.0 |
| Pluronic F 87 | 4.0 |
| Propylene-glycol | 5.0 |
| Water | 6.0 |
| Sodium hydroxide | 3.0 |
| | 100.0 |

| Example 2 | % by weight |
|---|---|
| Acronal V 205 | 30.0 |
| Vinacryl 4512 | 40.0 |
| Epotal 181 D | 3.0 |
| Polyvinylpyrrolidone | 0.4 |
| Palmitic acid | 9.0 |
| Pluronic F 108 | 5.0 |
| Water | 4.6 |
| Sodium hydroxide | 3.0 |
| Triethylene-glycol | 5.0 |
| | 100.0 |

| Example 3 | % by weight |
|---|---|
| Acronal V 205 | 18.0 |
| Vinacryl 4512 | 30.5 |
| Epotal 181 D | 8.0 |
| Stearic acid | 9.0 |
| Pluronic F 87 | 3.5 |
| Sodium hydroxide | 3.0 |
| Water | 24.0 |
| Polyvinylpyrrolidone | 4.0 |
| | 100.0 |

We claim:

1. A stick for the application of adhesive material to a substrate, comprising an adhesive dissolved or dispersed in a liquid medium containing an alkali metal or ammonium salt of an aliphatic carboxylic acid having from 8 to 36 carbon atoms, characterised in that the adhesive comprises a mixture of (i) an aqueous dispersion of an optionally carboxylated ($C_4$ to $C_{10}$)-alkyl ester of acrylic acid and (ii) an aqueous dispersion of polyethylene.

2. A stick according to claim 1, in which the optionally carboxylated ($C_4$ to $C_{10}$)-alkyl ester of acrylic acid is present in an amount of from 10 to 60% by weight, based on the dry weight of the ester relative to the total weight of the stick composition.

3. A stick according to claim 1, in which the optionally carboxylated ($C_4$ to $C_{10}$)-alkyl ester of acrylic acid comprises one or both of (i) a carboxylated octyl ester of acrylic acid and (ii) a carboxylated ethyl hexyl ester of acrylic acid.

4. A stick according to claim 3, in which the two esters (i) and (ii) specified in claim 3 are both present, in a dry weight ratio of from 9:1 to 1:9.

5. A stick according to claim 1, in which the polyethylene is present in an amount of from 0.5 to 10% by weight, based on the dry weight of the polyethylene relative to the total weight of the stick composition.

6. A stick according to claim 1, in which the alkali metal or ammonium salt is a salt of an aliphatic monocarboxylic acid, especially a fatty acid having from 12 to 22 carbon atoms.

7. A stick according to claim 6, in which the alkali metal salt comprises sodium stearate or sodium palmitate or a mixture thereof.

8. A stick according to claim 7, which comprises the sodium stearate and or sodium palmitate in an amount of from 4 to 10% by weight, based on the total weight of the stick composition.

9. A stick according to claim 1, which additionally comprises an alkali metal hydroxide in an amount of from 1 to 5% by weight, based on the total weight of the stick composition.

* * * * *